United States Patent
Bruce et al.

(10) Patent No.: US 7,186,092 B2
(45) Date of Patent: Mar. 6, 2007

(54) AIRFOIL HAVING IMPROVED IMPACT AND EROSION RESISTANCE AND METHOD FOR PREPARING SAME

(75) Inventors: Robert William Bruce, Loveland, OH (US); Jerry Donald Schell, Evendale, OH (US); Mark Daniel Gorman, Wester Chester, OH (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 10/898,755

(22) Filed: Jul. 26, 2004

(65) Prior Publication Data

US 2006/0018760 A1      Jan. 26, 2006

(51) Int. Cl.
*F01D 5/14*     (2006.01)
*F01D 5/28*     (2006.01)

(52) U.S. Cl. .............................. 416/241 R; 416/223 R; 416/229 R; 415/217.1; 428/610; 427/180

(58) Field of Classification Search ............ 416/223 R, 416/224, 229 A, 229 R, 241 R, 241 B; 415/200, 415/217.1; 428/610, 627, 216; 427/180
See application file for complete search history.

(56) References Cited

U.S. PATENT DOCUMENTS

| | | | |
|---|---|---|---|
| 2,922,721 A * | 1/1960 | Tarkan et al. ............... | 427/180 |
| 3,951,612 A | 4/1976 | Gates et al. | |
| 4,492,522 A | 1/1985 | Rossmann et al. | |
| 4,666,733 A | 5/1987 | Wiodek | |
| 4,741,975 A | 5/1988 | Naik | |
| 4,839,245 A | 6/1989 | Sue et al. | |
| 4,904,528 A | 2/1990 | Gupta et al. | |
| 4,904,542 A | 2/1990 | Mroczkaowski | |
| 4,919,773 A | 4/1990 | Naik | |
| 4,931,152 A | 6/1990 | Nalk et al. | |
| 4,999,255 A | 3/1991 | Jackson et al. | |
| 5,137,422 A | 8/1992 | Price et al. | |
| RE34,173 E | 2/1993 | Kerber | |
| 5,344,235 A | 9/1994 | Weetman et al. | |
| 5,350,599 A | 9/1994 | Rigney et al. | |
| 5,375,978 A | 12/1994 | Evans et al. | |
| 5,419,976 A | 5/1995 | Dulin | |
| 5,449,273 A | 9/1995 | Hertel et al. | |

(Continued)

*Primary Examiner*—Igor Kershteyn
(74) *Attorney, Agent, or Firm*—Eric W. Guttag; Jagtiani + Guttag; Ted Cummings (57) ABSTRACT

A turbine airfoil having an improved impact and erosion resistance. The airfoil comprises: (a) a base segment having an impact resistant leading edge section proximate to the leading edge comprising a material having having a yield strength of least about 250 ksi and an elongation percentage of about 12% or less; and (b) an erosion resistant coating overlaying the base segment at least in the leading and trailing edge portions of the pressure side, the erosion resistant coating comprising at least one ceramic layer having at least one of the following properties: (1) an erosion value of at least about 200 g. of erodent to cause a thickness loss of about 15–20 microns; (2) an erosion volume loss value (V) of about 1.9 or less as defined by the equation $V=H^{-0.18} \times E^{0.75} \times F^{-1.65}$ where H is hardness, E is elastic modulus and F is fracture toughness; and (3) an F value of at least about 1.5 MPa*m$^{1/2}$. The erosion resistant coating can comprise alternating ceramic and metallic layers and is typically formed by a method involving the step of forming on the pressure side of the base segment of the airfoil in alternating fashion at least one ceramic layer and at least one metallic layer.

29 Claims, 4 Drawing Sheets

U.S. PATENT DOCUMENTS

| | | |
|---|---|---|
| 5,486,096 A | 1/1996 | Hertel et al. |
| 5,542,820 A | 8/1996 | Eaton et al. |
| 5,547,767 A | 8/1996 | Paidassi et al. |
| 5,656,364 A | 8/1997 | Rickerby et al. |
| 5,683,825 A | 11/1997 | Bruce et al. |
| 5,690,716 A | 11/1997 | Sampath |
| 5,702,829 A | 12/1997 | Paidassi et al. |
| 5,747,163 A | 5/1998 | Douglas |
| 5,782,607 A | 7/1998 | Smith et al. |
| 5,876,572 A | 3/1999 | Rickerby et al. |
| 5,895,205 A * | 4/1999 | Werner et al. ............ 415/210.1 |
| 5,952,085 A | 9/1999 | Rickerby et al. |
| 6,218,029 B1 * | 4/2001 | Rickerby .................... 428/615 |
| 6,387,541 B1 * | 5/2002 | Gray et al. ................. 428/660 |
| 6,447,932 B1 | 9/2002 | O'Hara et al. |
| 6,451,454 B1 | 9/2002 | Hasz et al. |
| 6,482,534 B2 | 11/2002 | Itsukaichi |
| 6,503,290 B1 | 1/2003 | Jarosinski et al. |
| 6,649,682 B1 | 11/2003 | Breton et al. |

* cited by examiner

AIRFOIL HAVING IMPROVED IMPACT AND EROSION RESISTANCE AND METHOD FOR PREPARING SAME

STATEMENT REGARDING FEDERALLY SPONSORED RESEARCH

This invention was made with Government support under Contract No. N00019-96-C-0176 awarded by the Office of Naval Research. The Government may have certain rights to the invention.

BACKGROUND OF THE INVENTION

This invention relates to turbine airfoils, especially turbine compressor airfoils, having improved impact and erosion resistance. This invention further relates to a method for forming improved erosion resistance coatings on these turbine airfoils.

Airfoils used in gas turbine engines can suffer from erosion and impact caused by particles ingested into the engine, especially in helicopter turboshaft engines. This is particularly true of the airfoils that comprise the turbine engine compressors. The effects of such ingestion can result in power loss, increased fuel consumption, increased gas turbine generator temperatures, as well as scrapping of compressor components long before the expected fatigue life limits. This performance loss can be sufficient to force these engines to be removed from the aircraft for compressor overhaul to regain lost performance.

Turbine compressor performance can be degraded because of impact damage to the leading edges of the compressor airfoils, as well as erosion of portions of the side or surface of the airfoil beyond the leading edge. Erosion and impact damage to airfoils can occur relatively quickly in desert environments due to sand ingestion. The impact of large sand particles can cause burr formation where the leading edge of the airfoil gets rolled or curled over, thus disturbing the airflow and degrading compressor performance. Additionally, erosion on the pressure surface or side of the airfoil contributes to early replacement or removal as the effective surface area of the airfoil decreases and the cross section (i.e., thickness) becomes too thin.

Both impact and erosion resistance needs to be addressed to increase the durability and longevity of gas turbine compressors, especially in environments such as the desert where particle ingestion is a significant issue. However, impact and erosion damage is the result of different problems created by the ingestion of these particles. Impact damage is primarily caused by high kinetic energy particle impacts on the leading edge of the airfoil. The particle flow, traveling at relatively high velocities, strikes the leading edge or section of the airfoil at a shallow upward angle of from about 30° below the concave or pressure surface or side of the airfoil, to angle directly or head on to leading edge (0°), i.e., at an angle perpendicular or 90° to the leading edge of the airfoil. Because the airfoil is typically made of relatively ductile metals, this shallow upward to direct or head on striking of the leading edge is what causes burrs to form where the portion of the leading edge struck by the particle deforms and then rolls over or curls. In addition to disturbing the airflow and degrading compressor efficiency, these burrs constrain the airflow, necessitating the engine to compensate by consuming more fuel for the required power.

Erosion damage is primarily caused by glancing or oblique particle impacts on the concave or pressure side or surface of the airfoil, and tends to be focused in the area in front or forward of the trailing edge, and secondarily in the area aft or beyond the leading edge. These glancing impacts on the concave airfoil surface can cause portions thereof to be eroded. This erosion typically occurs proximate or at or around the trailing edge nearest the tip of the airfoil. As a result, the airfoil steadily loses its effective surface area due to significant chord length loss, as well as becoming thinner, resulting in a decrease in compressor performance of the engine.

Hard coatings, such as titanium nitride and other nitride coatings, have been applied to the metal airfoil to alleviate or minimize such erosion. See, for example, U.S. Pat. No. 4,904,528 (Gupta et al), issued Feb. 27, 1990 (titanium nitride coating for turbine engine compressor components to reduce erosion); U.S. Pat. No. 4,839,245 (Sue et al), issued Jun. 13, 1989 (zirconium nitride coating for turbine blades to provide erosion resistance). However, standard titanium nitride coatings are less capable of resisting impact damage caused by particles that strike the leading edge of the airfoil directly or head on. Titanium nitride coatings can also adversely impact the high-cycle fatigue (HCF) strength of the airfoil. Thicker coatings, such as HVOF applied tungsten carbide coatings, can provide greater impact resistance than titanium nitride coatings. See, for example, U.S. Pat. No. 4,741,975 (Naik et al), issued May 3, 1988 (tungsten carbide or tungsten carbide/tungsten coating applied to a layer of palladium, platinum or nickel on a turbine compressor blade for erosion resistance). However, such tungsten carbide coatings are often too thick and heavy to be applied to fast rotating airfoils, especially for helicopter turboshaft engines, and are generally too thick to be implemented with existing airfoil designs.

Accordingly, it would also be desirable to improve the impact resistance properties of turbine airfoils, in particular turbine compressor airfoils used in helicopter turboshaft engines. It would also be desirable to be able to decrease erosion, and especially improve the erosion resistance of such turbine airfoils. It would be further desirable to improve such erosion resistance without adversely affecting other desirable properties of the turbine airfoil such as high-cycle fatigue strength.

BRIEF DESCRIPTION OF THE INVENTION

An embodiment of this invention relates to a turbine airfoil having improved impact resistance, as well as improved erosion resistance. This airfoil has a leading edge, a trailing edge, a convex curved surface suction side extending from the leading to the trailing edge, and a concave curved surface pressure side extending from the leading to the trailing edge, the pressure side having a leading edge portion aft of the leading edge and a trailing edge portion forward of the trailing edge. This airfoil comprises:

a. a base segment having an impact resistant leading edge section proximate to the leading edge comprising a material having a yield strength of at least about 250 ksi and an elongation percentage of about 12% or less; and b. an erosion resistant coating overlaying the base segment at least in the leading and trailing edge portions of the pressure side, the erosion resistant coating comprising at least one ceramic layer having at least one of the following properties: (1) an erosion value of at least about 200 g. of erodent to cause a thickness loss of about 15–20 microns; (2) an erosion volume loss value (V) of about 1.9 or less as defined by the equation $V = H^{-0.18} \times E^{0.75} \times F^{-1.65}$, wherein H is hardness, E is elastic modulus and F is fracture toughness; and (3) an F value of at least about 6.0 MPa*m$^{1/2}$.

Another embodiment of this invention relates to a method for forming an erosion resistant coating comprising alternating ceramic and metallic layers on the base segment of the airfoil. This method comprises the step of forming on the pressure side of the base segment in an alternating fashion at least one ceramic layer and at least one metallic layer.

The airfoils of this invention having the improved impact resistant leading edge section and erosion resistant coating, as well as the method of this invention for forming the erosion resistant coating, provide several benefits and advantages. The impact resistant leading edge section improves the impact resistance properties of turbine airfoils, in particular turbine compressor airfoils used in helicopter turboshaft engines. The erosion resistant coating improves the erosion resistance of such airfoils, but without adversely affecting other desirable properties of the turbine airfoil such as high-cycle fatigue strength.

DETAILED DESCRIPTION OF THE INVENTION

As used herein, the term "elongation" refers to the increase in gage length of the specimen measured after fracture of the specimen within the gage length, and expressed as the percentage of the original gage length or "elongation percentage" ($E_p$) according to the following equation:

$$E_p=[(L_x-L_o)/L_o]\times 100$$

wherein $L_o$ is the original gage length and $L_x$ is the final gage length. See Davis, ASM Materials Engineering Dictionary (1992), p. 114

As used herein, the term "fracture toughness" refers to the measurement of the resistance of the specimen being tested to extension of a crack. Fracture toughness of a specimen is measured herein by the Charpy impact test. See Davis, ASM Materials Engineering Dictionary (1992), p. 72.

As used herein, the term "hardness" refers to the measurement of the resistance of the material to surface indentation or abrasion. The hardness of a material is measured herein by units of indentation (in GPa) using Brinell or Rockwell hardness tests for metallic materials and Vickers or Knoop hardness tests for ceramic materials. See Davis, ASM Materials Engineering Dictionary (1992), p. 200.

As used herein, the terms "modulus of elasticity" or "elastic modulus" (E) refer interchangeably to the measurement of the rigidity or stiffness of the material, expressed as the ratio of stress, below the proportional limit, to the corresponding strain. See Davis, ASM Materials Engineering Dictionary (1992), p. 280. The E value (in GPa) of a material is determined herein by the 4 point bend test.

As used herein, the term "yield strength" refers to the stress at which a material exhibits a specified deviation from proportionality of stress and strain. See Davis, ASM Materials Engineering Dictionary (1992), p. 534.

As used herein, the term "comprising" means various compositions, compounds, components, layers, steps and the like can be conjointly employed in the present invention. Accordingly, the term "comprising" encompasses the more restrictive terms "consisting essentially of" and "consisting of."

All amounts, parts, ratios and percentages used herein are by weight unless otherwise specified.

The embodiments of the turbine airfoils of this invention having improved impact and erosion resistance include turbine airfoils that can be removably attached to a central hub or disk, or can be turbine airfoils integral with the hub or disk, i.e., a turbine blisk. These turbine airfoils (e.g., turbine blades) can be used with a wide variety of turbine engine (e.g., gas turbine engine) components. These turbine engine components include turbine fans, turbine vanes, and turbine compressors. The embodiments of the turbine airfoils of this invention having improved impact and erosion resistance are particularly useful in turbine compressors and especially those turbine compressors used in helicopter turboshaft engines. However, while the following discussion of embodiments of the turbine airfoils of this invention having improved impact and erosion resistance will be with reference to turbine compressor airfoils or blades, it should also be understood that this invention can be useful for other turbine airfoils requiring impact and erosion resistance.

Figure 1:
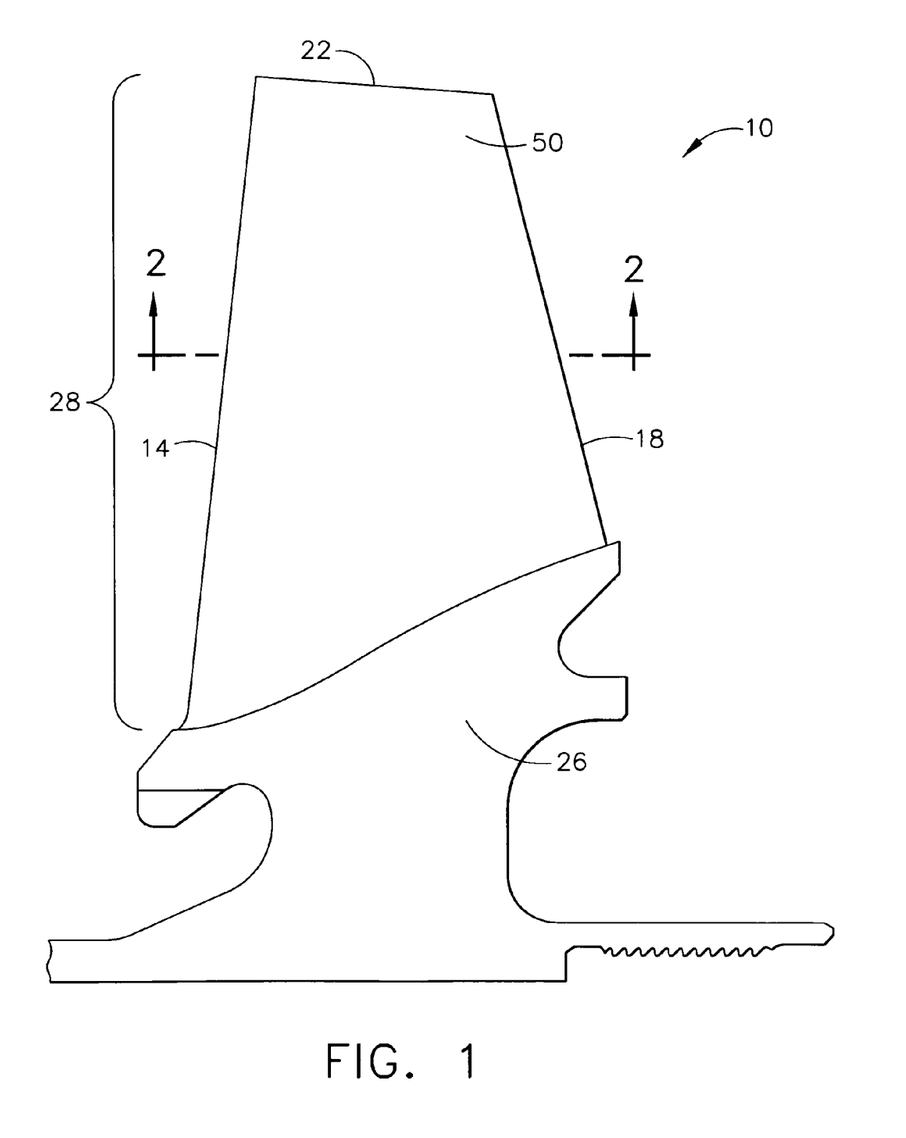
FIG. 1 is a top plan view of a typical turbine compressor airfoil.

The various embodiments of the turbine airfoils of this invention are further illustrated by reference to the drawings as described hereafter. Referring to the drawings, FIG. 1 depicts a typical turbine compressor blade indicated generally as 10. Blade 10 has a leading edge indicated as 14, a trailing edge indicated as 18, a tip edge indicated as 22 and a blade root indicated as 26. The span of blade 10 is indicated as 28 and extends from tip edge 22 to blade root 26.

Figure 2:
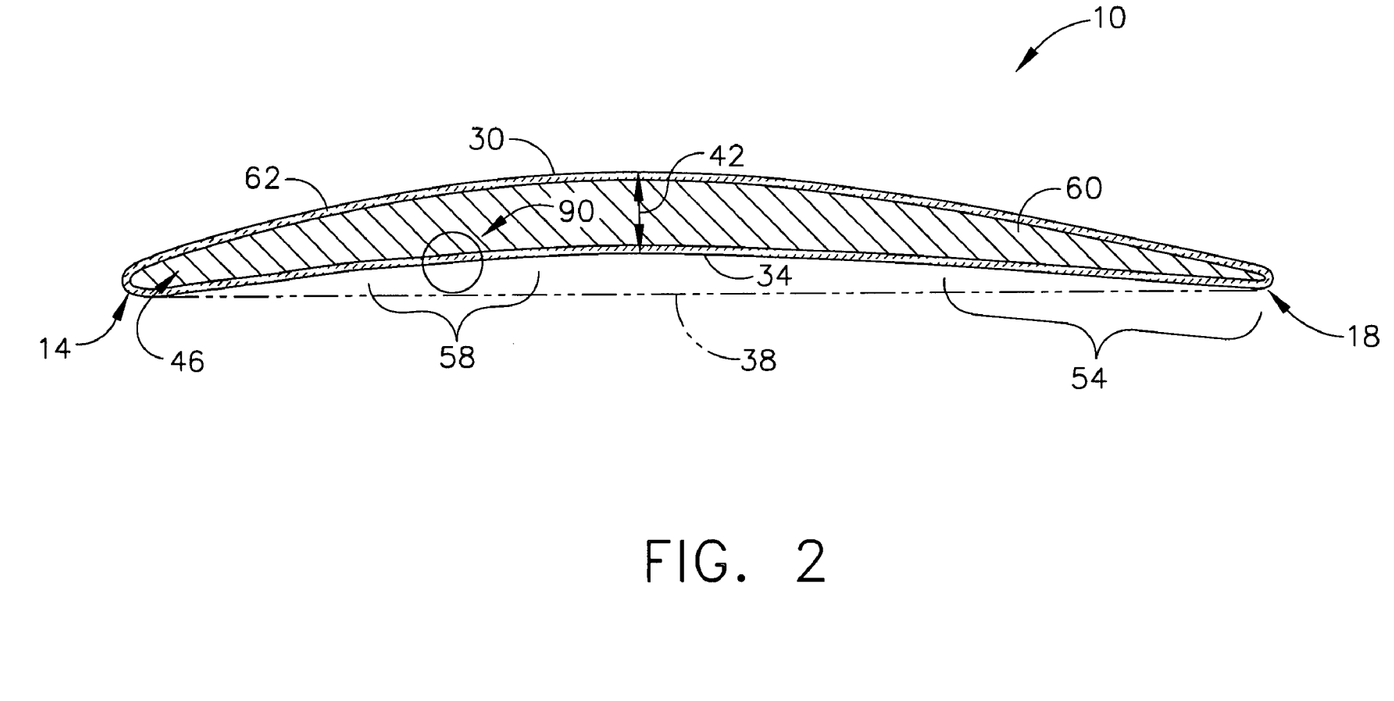
FIG. 2 is a sectional view along line 2—2 of FIG. 1.

FIG. 2 shows the convex curved surface or side of blade 10 (also referred to as the "suction" side or surface of the blade) indicated generally as 30 that extends between leading and trailing edges 14 and 18, as well as the concave curved surface or side of blade 10 (also referred to as the "pressure" surface or side of the blade) indicated as 34 that also extends between leading and trailing edges 14 and 18. The dashed line indicated by 38 that extends from the leading edge 14 to the trailing edge 18 defines the width or chord of blade 10. The double headed arrow indicated by 42 between suction side 30 and pressure side 34 defines the thickness (usually measured as the "maximum" thickness) of blade 10.

Referring to FIG. 2, the leading edge section of blade 10 indicated generally as 46 is where the greatest impact damage tends to occur, especially at or proximate to leading edge 14. Referring to FIGS. 1 and 2, the area of greatest erosion damage tends to occur in the tip edge portion or area of span 28 indicated generally as 50, especially at or proximate to tip edge 22, and also tends to be focused in the portion or area of pressure side 34 indicated generally as 54 that is directly forward of trailing edge 18 and to a lesser extent in the portion or area indicated generally as 58 of pressure side 34 that is directly aft of leading edge 14.

To prevent or minimize impact damage, and as shown in FIG. 2, blade 10 is provided with a higher yield strength and lower elongation material in at least the leading edge section 46 of base segment or substrate 60 of blade 10. As also shown in FIG. 2 and to prevent or minimize erosion damage, an erosion resistant coating indicated generally as 62 is overlayed on base segment 60.

Suitable materials for preventing or minimizing impact damage in the leading edge section 46 of base segment 60 will have a yield strength of at least about 250 ksi, typically at least about 300 ksi and more typically at least about 320 ksi, and typically in the range of from about 300 to about 360 ksi, more typically in the range of from about 320 to about 360 ksi. Suitable metals or metal alloys will also have an elongation percentage or $E_p$ value of about 12% or less, typically less than about 8%, more typically less than about 5%. Suitable materials having such higher yield strength and lower elongation percentage properties include metals and metal alloys such as iron (i.e., steel and steel alloys), nickel and nickel alloys, as well as cemented carbides and other composite materials. Representative metals and metal alloys having such higher yield strength and lower elongation percentage properties include 18Ni(350) (a steel alloy comprising 18.0% Ni, 4.2% Mo, 12.5% Co, 1.6% Ti, 0.1% Al), S7 (a steel alloy comprising 0.5% C, 0.5% Mn, 0.6% Si, 3.25% Cr, 1.5% Mo, 0.25% V), GE-1014-SS2 (a steel alloy comprising 0.25% C, 9.7% Co, 1.35% Al, 1.3% Mo, 13.1% Ni, 2.2% Cr), Elmax (a steel alloy comprising 1.7% C, 0.8% Si, 0.3% Mn, 18.0% Cr, 1.0% Mo and 3.0% V) and BG 42 (a steel alloy comprising 1.15% C, 0.3% Si, 0.5% Mn, 14.5% Cr, 4.0% Mo and 1.2% V).

These materials having higher yield strength and lower elongation percentage properties typically minimize burring of leading edge 14 to less than about 5 mils (127 microns), more typically to less than about 2 mils (51 microns), as well as minimize chord loss (i.e., relative to chord 38) to typically less than about 15 mils (381 microns), more typically less than about 12 mils (305 microns). The degree of burring and chord loss is typically measured by sending a stream of sand particles of particle size up to about 60 mils (1524 microns) at a velocity of about 1000 mph (1609 km/h) upwardly at an angle of about 20° against a test airfoil specimen having a thickness of about 10 mils (254 microns) at the leading edge 14. Burring is measured optically as the height of the burr above the plane formed by the convex/suction side 30 of the test airfoil specimen at leading edge 14 (i.e., how much edge 14 is raised up); the degree of burring is determined by averaging the three highest measurements over each 1.5 inch (3.81 cm) section of the test airfoil specimen along leading edge 14. The chord loss is determined by: (1) measuring the chord dimension 38 of the test airfoil specimen, both before and after testing, with calipers at 3 spots along the length of the test airfoil specimen; and (2) averaging the difference between the measured chord values before and after testing.

Figure 3:
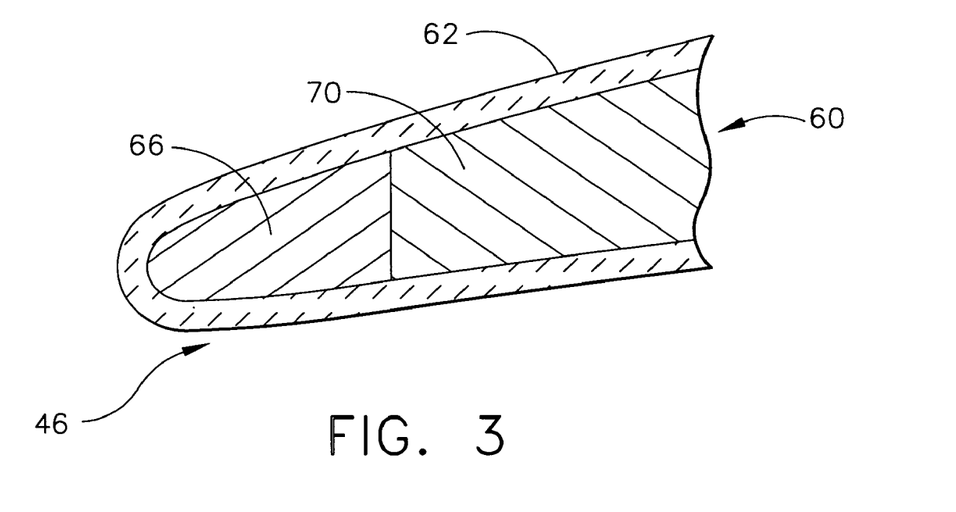
FIG. 3 is a fragmentary view of an alternative embodiment to that shown in FIG. 2.

As shown in FIG. 2, the higher yield strength, lower elongation percentage material can comprise all or substantially all of the base segment 60 of blade 10. An alternative embodiment of base segment 60 is shown in FIG. 3. In this alternative embodiment, base segment 60 comprises a forward impact resistant portion indicated generally as 66 proximate to the leading edge section 46 that comprises the higher yield strength, lower elongation percentage material, and a rearward main portion indicated generally as 70 that can comprise a material (e.g., metal or metal alloy) typically used in blades 10 that does not necessarily have higher yield strength and lower elongation percentage properties (e.g., can a have a yield strength of less than about 250 ksi and an elongation percentage of greater than about 7.5%), such as steel and steel alloys, nickel based alloys, titanium and titanium based alloys, for example, A286, AM355, IN718 and Ti6-4. Impact resistant portion 66 and main portion 70 can be joined, attached or otherwise associated together in a suitable manner such as by welding, using a suitable adhesive, mechanically locking together (e.g., a dovetail fit) or simply by the overlayed erosion resistant coating 62 if of suitable strength and durability for this purpose.

Figure 4:
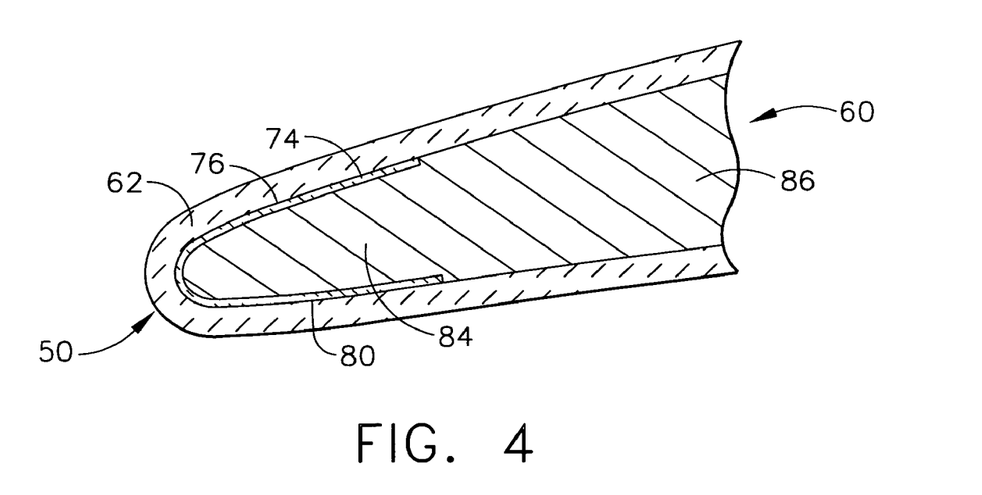
FIG. 4 is a fragmentary view of another alternative embodiment to that shown in FIG. 2.

Another alternative embodiment to provide impact resistance for blade 10 is shown in FIG. 4. As shown in FIG. 4, the impact resistant portion of leading edge section 46 is in the form of an impact resistant sheath indicated generally as 74 that comprises the higher yield strength, lower elongation percentage material. This sheath 74 has an upper or convex segment 76 and a lower or concave segment 80 that permit sheath to be joined, attached or otherwise associated with a complementary shaped forward portion 84 of main section 86 of base segment 60 that can comprise a material (e.g., metal or metal alloy) typically used in blades 10 that does not necessarily have higher yield strength and lower elongation percentage properties (e.g., can a have a yield strength of less than about 250 ksi and an elongation percentage of greater than about 7.5%), as previously described and defined for main portion 70 of the embodiment shown in FIG. 3.

Erosion resistant coating 62 can have a thickness of at least about 15 microns, with a thickness typically in the range of from about 15 to about 51 microns, more typically from about 20 to about 25 microns. Coatings 62 comprise at least one ceramic layer and optionally at least one metallic (metal) layer. This ceramic layer(s) typically comprises at least one ceramic material selected from the group consisting of tantalum carbide, niobium carbide, titanium carbide, titanium aluminum chromium carbide (TiAlCrC), titanium aluminum chromium nitride (TiAlCrN), titanium aluminum nitride (TiAlN), titanium aluminum carbide (TiAlC), boron carbide ($B_4C$), as well as combinations thereof. The metallic (metal) layer(s) typically comprises at least one metal selected from the group consisting of tantalum, niobium or titanium, as well as alloys thereof, including titanium aluminum alloys and titanium aluminum chromium alloys.

The ceramic materials for the ceramic layer(s) and metals/metal alloys for the optional metallic layer(s) are selected such that coating 62 imparts suitable erosion resistance properties to blade 10 at least in the portion or area 54 and 58 of pressure side 34, typically over the entire or substantially the entire area of pressure side 34, and more typically over the entire or substantially the entire area of pressure side 34 and suction side 30.

More typically, suitable coatings 62 for use herein comprise a plurality of alternating ceramic and metallic (metal) layers formed from at least one ceramic layer and at least one metallic layer. Coatings 62 formed solely or substantially of ceramic layers tend to have increased stresses that could cause coating 62 to weaken and spall. Coatings 62 that comprise alternating metallic and ceramic layers tend to mitigate or minimize such stresses. The metallic layers typically comprise the metal atom(s) of the corresponding ceramic in ceramic layers. For example, where the ceramic layer comprises titanium carbide, the metallic layer typically comprises titanium. However, although less desirable, the metallic layers can comprise a different metal atom(s) from that of the ceramic in the ceramic layers. The ceramic layers can also comprise different ceramics, e.g., tantalum carbide in one ceramic layer and niobium carbide in another ceramic layer.

Figure 5:
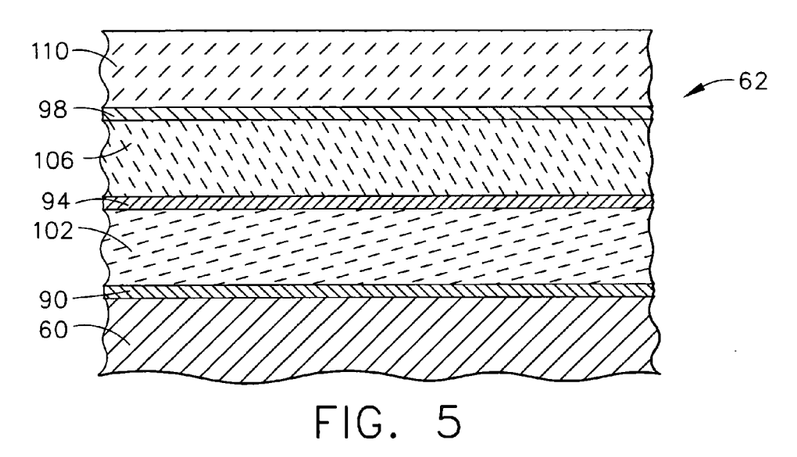
FIG. 5 is an enlarged fragmentary view of FIG. 2 showing an embodiment of the erosion resistant coating.

An embodiment of erosion resistant coating 62 comprising a plurality of alternating ceramic and metallic layers is shown in FIG. 5. As shown in FIG. 5, coating 62 comprises alternating metallic layers 90, 94 and 98 and ceramic layers

102, 106 and 110. As shown in FIG. 5, a metal layer such as 90 is typically the innermost of coating 62 and is directly adjacent to substrate 60, while the outermost layer of coating 60 is typically a ceramic layer such as 110. Having metal layer 90 directly adjacent to substrate tends to promote the adherence of coating 62 to substrate. Having ceramic layer 110 be the outermost layer tends to provide a coating 62 having greater erosion resistance. However, although less desirable, the order of metallic and ceramic layers can be reversed such that layer 90 could comprise a ceramic layer directly adjacent to substrate 60, while outermost layer 110 comprise a metal layer.

The erosion resistant coatings 62, including those comprising a plurality of alternating ceramic and metallic layers, are typically formed by physical vapor deposition (PVD), such as EB-PVD, filtered arc deposition, and more typically by sputtering. Suitable sputtering techniques for use herein include but are not limited to direct current diode sputtering, radio frequency sputtering, ion beam sputtering, reactive sputtering, magnetron sputtering and steered arc sputtering. Typically, magnetron sputtering and steered arc used in the method of this invention. In forming the ceramic layers (e.g., layers 102, 106 and 110) comprising carbides or nitrides, sputtering is typically carried out in an atmosphere comprising a source of carbon (e.g., methane) or a source of nitrogen (e.g., nitrogen gas). In forming the metallic layers (e.g., layers 90, 94 and 98), sputtering is typically carried out in an inert atmosphere (e.g., argon).

The erosion resistant coatings 62 minimize volume loss due to erosion. Ceramic components of coatings 62 having potentially suitable minimum volume loss due to erosion can be selected by the following equation:

$$V = H^{-0.18} \times E^{0.75} \times F^{-1.65}$$

wherein V is the volume loss due to erosion, H is the hardness of the coating material (usually based on the ceramic material), E is elastic modulus of the coating material (usually based on the ceramic material), and F is fracture toughness of the coating material (usually based on the ceramic material). Suitable coatings 62 will typically have a V value of about 1.9 or less. Coating materials with such minimum V values usually have H values of at least about 19 GPa and typically in the range of from about 19 to about 30 GPa, more typically from about 25 to about 30 GPa; E values of at least about 200, and typically in the range of from about 200 to about 800 GPa, more typically from about 200 to about 750 GPa; F values of at least about 1.5 MPa*m$^{1/2}$, and typically in the range of from about 1.5 to about 14 MPa*m$^{1/2}$, more typically from about 6 to about 14 MPa*m$^{1/2}$. In this equation for volume loss due to erosion, the F value or fracture toughness tends to predominate because of the wider range of F values for the various coating materials.

Suitable coatings 62 also usually have minimum erosion values (based on the number of grams (g.) of erodent required to cause coating 62 to lose about 15–20 microns of its thickness). Suitable coatings 62 for use herein typically have erosion values of at least about 200 g. of erodent to cause about 15–20 microns of thickness loss in coating 62, more typically at least about 800 g. of erodent. Erosion values herein are determined by testing carried out using a test apparatus (see FIG. 6) indicated generally as 200. Test apparatus 200 includes test stand indicated as 204 to support the test specimen indicated as 208. The erodent in the form of ~50 micron alumina particles is stored in a vibrator hopper indicated as 212. Hopper 212 feeds the alumina particles in about 50 g. increments to a blast gun ("Port a Blast" gun, Lindberg Products Co.) indicated as 216. Blast gun 216 fires the alumina particles at test specimen 208 at an incidence angle of 20° and a velocity of about 160 ft./sec. (48.8 m./sec) due to compressed air supplied from air supply line 220 that goes through a connecting air line indicated as 224. Air from air supply line 220 enters connecting air line 224 through a shutoff valve indicated as 228 and passes through a filter indicated 232. A solenoid valve 236 for opening and closing air line 224, a pressure regulator 240 for controlling pressure at the set point and a precision bore flow meter 244 for measuring the flow of air through air line 224 are also provided. Connecting air line 224 supplies compressed air to blast gun 216 through a connector indicated as 248. Apparatus 200 is also provided with a timer 252 for determining whether the alumina particles flowed out of hopper 212 within the desired time.

Figure 6:
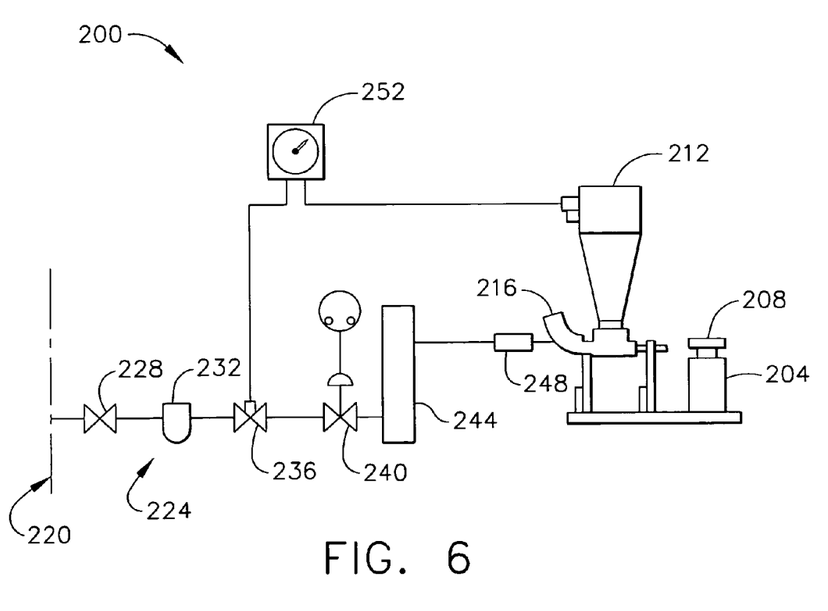
FIG. 6 shows an apparatus for determining the erosion value of ceramic coatings.

The erodent testing using apparatus 200 is carried out as follows:

1. Test Specimens. Test specimen 208 are in the form of a 1 inch (2.54 cm.) by 2 inch (5.08 cm.) panel having a thickness of from 50 to 185 mils (1.27 to 4.70 mm). The panels are cleaned, pretreated and coated with coating 62; a minimum of two coated panels are used in each evaluation.

2. Erosion Testing. Test specimen 208 is firmly supported by test stand 204 at an angle of 90°±4° to the axis of the blast nozzle of blast gun 216 and at a distance of 4.0±0.06 inches (101.6±1.5 mm) between the tip of the nozzle and the surface of specimen 208 to be tested. Alumina particles (average particle size of 50 microns) are used as the erodent. The pressure in connecting air line 224 is adjusted to provide a pressure of 25 psi (172 kPa) to blast gun 216 during erodent testing until the erodent particles in hopper 212 are consumed.

After specimen 208 is subjected to erodent testing with apparatus 200, the deepest point of erosion of specimen 208 is measured with a ball point micrometer with at least 3 measurements being made and the results normalized and reported as microns eroded per grams (g.) of erodent.

While specific embodiments of this invention have been described, it will be apparent to those skilled in the art that various modifications thereto can be made without departing from the spirit and scope of this invention as defined in the appended claims.

What is claimed is:

1. A turbine airfoil having a leading edge, a trailing edge, a convex curved surface suction side extending from the leading to the trailing edge, and a concave curved surface pressure side extending from the leading to the trailing edge, the pressure side having a leading edge portion aft of the leading edge and trailing edge portion forward of the trailing edge, the turbine airfoil comprising:

a. a base segment having an impact resistant leading edge section proximate to the leading edge comprising a metal or metal alloy having a yield strength of at least about 250 ksi and an elongation percentage of about 12% or less; and b. an erosion resistant coating overlaying the base segment at least in the leading and trailing edge portions of the pressure side, the erosion resistant coating comprising at least one ceramic layer having at least one of the following properties: (1) an erosion value of at least about 200 g. of erodent to cause a thickness loss of about 15–20 microns; (2) an erosion volume loss value (V) of about 1.9 or less as defined by the equation $V = H^{-0.18} \times E^{0.75} \times F^{-1.65}$ wherein H is hardness, E is elastic modulus and F is fracture toughness; and (3) an F value of at least about 1.5 MPa*m$^{1/2}$, and wherein the at least one ceramic layer comprises a ceramic material selected from the group consisting of tantalum carbide, niobium carbide, titanium carbide, titanium aluminum chromium carbide (TiAlCrC), titanium aluminum chromium nitride (TiAlCrN), titanium aluminum nitride (TiAlN), titanium aluminum carbide (TiAlC), boron carbide (B$_4$C), and combinations thereof.

2. The airfoil of claim 1 wherein the leading edge section comprises a steel or steel alloy having a yield strength of at least about 300 ksi and an elongation percentage of less than about 8%.

3. The airfoil of claim 2 wherein the leading edge section comprises a steel or steel alloy having a yield strength in the range of from about 320 to about 360 ksi and an elongation percentage of less than about 5%.

4. The airfoil of claim 1 wherein the base segment comprises a forward impact resistant leading edge section and a rearward main portion joined to the leading edge section comprising a metal or metal alloy having a yield strength of less than about 250 ksi and an elongation percentage of greater than about 7.5%.

5. The airfoil of claim 1 wherein the leading edge section comprises an impact resistant sheath having an upper convex segment and a lower concave segment and wherein the base segment comprises a complementary shaped forward portion that the sheath is joined to, the forward portion comprising a metal or metal alloy having a yield strength of less than about 250 ksi and an elongation percentage of greater than about 7.5%.

6. The airfoil of claim 1 wherein the erosion resistant coating has an erosion value of at least about 800 g of erodent.

7. The airfoil of claim 1 wherein the erosion resistant coating has an F value of from about 1.5 to about 14 MPa*m$^{1/2}$.

8. The airfoil of claim 7 wherein the erosion resistant coating has an F value of from about 6 to about 14 MPa*m$^{1/2}$.

9. The airfoil of claim 7 wherein the erosion resistant coating has an H value of at least about 19 GPa.

10. The airfoil of claim 9 wherein the erosion resistant coating has an H value in the range of from about 19 to about 30 GPa.

11. The airfoil of claim 9 wherein the erosion resistant coating has an H value in the range of from about 25 to about 30 GPa.

12. The airfoil of claim 9 wherein the erosion resistant coating has an E value of at least about 200 GPa.

13. The airfoil of claim 12 wherein the erosion resistant coating has an E value in the range of from about 200 to about 800 GPa.

14. The airfoil of claim 12 wherein the erosion resistant coating has an E value in the range of from about 200 to about 750 GPa.

15. The airfoil of claim 1 wherein the ceramic material selected is from the group consisting of tantalum carbide, niobium carbide, titanium carbide, and combinations thereof.

16. A turbine airfoil having a leading edge, a trailing edge, a convex surface extending from the leading to the trailing edge and a convex curved surface suction side extending from the leading to the trailing edge, and a concave curved surface pressure side extending from the leading to the trailing edge, the pressure side having a leading edge portion aft of the leading edge and trailing edge portion forward of the trailing edge, the turbine airfoil comprising:

a. a base segment having an impact resistant leading edge section proximate to the leading edge comprising a material having yield strength of least about 250 ksi and an elongation percentage of about 12% or less; and b. an erosion resistant coating overlaying the base segment at least in the leading and trailing edge portions of the pressure side and having at least one of the following properties: (1) an erosion value of at least about 200 g. of erodent to cause a thickness loss of about 15–20 microns; (2) an erosion volume loss value (V) of about 1.9 or less as defined by the equation V=H$^{-0.18}$×E$^{0.75}$×F$^{-1.65}$ where H is hardness, E is elastic modulus and F is fracture toughness; and (3) an F value of at least about 1.5 MPa*m$^{1/2}$, the erosion resistant coating comprising:

(1) a plurality of alternating ceramic and metallic layers;

(2) the ceramic layers comprising a ceramic material selected from the group consisting of tantalum carbide, niobium carbide, titanium carbide, titanium aluminum chromium carbide (TiAlCrC), titanium aluminum chromium nitride (TiAlCrN), titanium aluminum nitride (TiAlN), titanium aluminum carbide (TiAlC), boron carbide (B$_4$C), and combinations thereof; and (3) the metallic layers comprising a metal or metal alloy and selected from the group consisting of tantalum, niobium, titanium, alloys thereof with aluminum and chromium, and combinations thereof.

17. The airfoil of claim 16 wherein the ceramic material selected is from the group consisting of tantalum carbide, niobium carbide, titanium carbide, and combinations thereof and wherein the metallic layers comprise a metal or metal alloy of the corresponding ceramic material and selected from the group consisting of tantalum, niobium, titanium, and combinations thereof.

18. The airfoil of claim 17 wherein the leading edge section comprises a steel or steel alloy having a yield strength of at least about 300 ksi and an elongation percentage of less than about 8%.

19. The airfoil of claim 17 wherein the erosion resistant coating has an erosion value of at least about 800 g of erodent.

20. The airfoil of claim 17 wherein the erosion resistant coating has an F value of from about 1.5 to about 14 MPa*m$^{1/2}$.

21. The airfoil of claim 20 wherein the erosion resistant coating has an F value of from about 6 to about 14 MPa*m$^{1/2}$.

22. The airfoil of claim 21 wherein the erosion resistant coating has an H value of at least about 19 GPa.

23. The airfoil of claim 22 wherein the erosion resistant coating has an H value in the range of from about 19 to about 30 GPa.

24. The airfoil of claim 22 wherein the erosion resistant coating has an E value of at least about 200 GPa.

25. The airfoil of claim 24 wherein the erosion resistant coating has an E value in the range of from about 200 to about 800 GPa.

26. A method for forming an erosion resistant coating on a base segment of a turbine airfoil having a leading edge, a trailing edge, a convex curved surface suction side extending from the leading to the trailing edge, and a concave curved surface pressure side extending from the leading to the trailing edge, the method comprising the step of forming on the pressure side of the base segment in alternating fashion at least one ceramic layer and at least one metallic layer, wherein the at least one ceramic layer is formed from a ceramic material selected from the group consisting of tantalum carbide, niobium carbide, titanium carbide, and combinations thereof and wherein the at least one metallic layer is formed from a metal or metal alloy of the corresponding ceramic material and selected from the group consisting of tantalum, niobium, titanium, and combinations thereof.

27. The method of claim 26 wherein the at least one ceramic layer and at least one metallic layer are formed by sputtering.

28. The method of claim 27 wherein the sputtering is magnetron sputtering or steered arc sputtering.

29. The method of claim 26 wherein one of the metallic layers is adjacent to the base segment.

* * * * *